(12) United States Patent
Ribarov et al.

(10) Patent No.: US 9,821,255 B2
(45) Date of Patent: Nov. 21, 2017

(54) SCREEN AND SCREEN ELEMENTS FOR FUEL SYSTEMS

(71) Applicant: Hamilton Sundstrand Corporation, Charlotte, NC (US)

(72) Inventors: Lubomir A. Ribarov, West Hartford, CT (US); Leo J. Veilleux, Jr., Wethersfield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 550 days.

(21) Appl. No.: 14/449,296

(22) Filed: Aug. 1, 2014

(65) Prior Publication Data

US 2016/0031566 A1 Feb. 4, 2016

(51) Int. Cl.
| | |
|---|---|
| *B01D 39/20* | (2006.01) |
| *B01D 35/18* | (2006.01) |
| *B01D 29/60* | (2006.01) |
| *B01D 29/56* | (2006.01) |
| *F02M 37/22* | (2006.01) |

(52) U.S. Cl.
CPC .......... *B01D 29/608* (2013.01); *B01D 29/56* (2013.01); *B01D 35/18* (2013.01); *B01D 39/2051* (2013.01); *F02M 37/221* (2013.01); *B01D 2239/065* (2013.01)

(58) Field of Classification Search
CPC .................................................. B01D 39/2051
See application file for complete search history.

(56) References Cited

U.S. PATENT DOCUMENTS

| 4,331,477 | A | * | 5/1982 | Kubo | ........................ | B22F 3/11 |
| | | | | | | 419/2 |
| 4,629,569 | A | * | 12/1986 | Gimbel | .................. | B01D 29/56 |
| | | | | | | 210/488 |
| 4,732,671 | A | * | 3/1988 | Thornton | ........... | B01D 17/0208 |
| | | | | | | 210/149 |
| 6,063,150 | A | * | 5/2000 | Peter | .................. | B01D 46/0063 |
| | | | | | | 55/282.3 |
| 2009/0001908 | A1 | * | 1/2009 | Shubinsky | ............ | B06B 1/0603 |
| | | | | | | 318/116 |

(Continued)

FOREIGN PATENT DOCUMENTS

| CN | 201962225 U | 9/2011 | |
| FR | WO 2012069745 A1 * | 5/2012 | ......... B01D 35/1435 |

OTHER PUBLICATIONS

Mason, J.G., Strapp, J.W., chow, P., "The Ice Particle Threat to Engines in Flight," AIAA 2006-0206 paper presented at the 44th AIAA Aerospace Sciences Meeting and Exhibit, Reno. NV, 9-1 Jan. 2006.

(Continued)

*Primary Examiner* — Krishnan S Menon
*Assistant Examiner* — Bradley R Spies
(74) *Attorney, Agent, or Firm* — Locke Lord LLP; Scott D. Wofsy; Christopher J. Cillié

(57) ABSTRACT

A screen element for a fuel system includes a first screen and a second screen. The first screen defines a first aperture and the second screen defines a second aperture. The first aperture and the second aperture are arranged out of circumferential alignment with one another such that a torturous flow path is defined through the apertures for capturing particles smaller than the apertures in a collection cavity defined between the screens.

15 Claims, 5 Drawing Sheets

(56) References Cited

U.S. PATENT DOCUMENTS

| | | | |
|---|---|---|---|
| 2011/0174704 A1* | 7/2011 | Yamada | B01D 29/01 |
| | | | 210/137 |
| 2011/0186582 A1* | 8/2011 | Whitaker | B22F 7/004 |
| | | | 220/563 |
| 2013/0068704 A1 | 3/2013 | Hagshenas | |
| 2013/0232989 A1 | 9/2013 | Osorio | |
| 2013/0238215 A1* | 9/2013 | Florentin | B01D 35/1435 |
| | | | 701/100 |
| 2016/0273455 A1* | 9/2016 | Fausett | B64D 41/00 |

OTHER PUBLICATIONS

Ashby, M.F., Evans, A., Fleck, N.A., Gibson, L.J., Hutchinson, J.W., Wadley, H.N.G., Met. Foams—A Design Guide, Butterworth-Heinemann, 2000.
Banhart, J., Manufacture, Characterization and Application of Cellular Metals and Metal Foams Prog. in Mat. Sci., v. 46, pp. 559-632, 2001.
Lu, T.J., Stone, H.A., Ashby, M.F., "Heat Transfer in Open-Cell Metal Foams," Acta Materiala vol. 36, pp. 3619-3635, Jun. 1998.
Mills, A.F., Heat Transfer, Richard D. Irwin, Inc., Boston, 1992.
Extended European Search Report for Application No. GB1511548.8 dated Jan. 12, 2016.

* cited by examiner

SCREEN AND SCREEN ELEMENTS FOR FUEL SYSTEMS

BACKGROUND OF THE INVENTION

1. Field of the Invention

The present disclosure relates to fuel systems, and more particularly to screening devices for separating entrained particulate from fuel traversing fuel systems.

2. Description of Related Art

Aircraft flight at high-altitude can offer operational advantages for long-range travel. However, high-altitude ambient air temperatures can be very low. Since water and water vapor present in jet fuel can freeze in fuel exposed to extremely low ambient temperatures for prolonged time intervals, flight at high altitudes potentially poses challenges for gas turbine engines that require a steady, uninterrupted fuel supply. Once formed, ice particulate can become entrained in the fuel flow and occlude components like pumps, heat exchangers, filters and the like. Components that lay dormant for extended flight intervals and are operated only as needed, such as auxiliary power units for example, can be particularly susceptible to icing.

One solution to this challenge is heating fuel traversing the fuel system to melt entrained ice in the fuel. This is typically accomplished using a hot bypass flow system, such as a 100% bypass flow system. Such bypass flow systems route low-pressure fuel through a fuel-oil heat exchanger and a high-pressure pump for purposes of heating fuel traversing the system. Once heated and pressurized, a portion of the fuel is returned to the fuel system upstream of the fuel-oil heat exchanger for pre-heating low-pressure fuel entering the fuel-oil heat exchanger.

Such conventional methods and systems have generally been considered satisfactory for their intended purpose. However, there is still a need in the art for improved ice filtration devices. The present disclosure provides a solution for this need.

SUMMARY OF THE INVENTION

A screen element for a fuel system includes a first screen and a second screen. The first screen defines a first aperture and the second screen defines a second aperture. The first aperture and the second aperture are arranged out of circumferential alignment with one another such that a torturous flow path is defined through the apertures for capturing particles smaller than the apertures in a collection cavity defined between the screens.

In certain embodiments the screens include a porous region disposed about respective peripheries of the apertures. The porous regions can include porous metal foam with pores smaller than the apertures. The first aperture can axially overlay a portion of the second screen porous region, defining an impingement region thereon. The impingement region can be configured for diverting and/or arresting particles entrained in fluid traversing the first aperture while allowing the fluid to traverse the impingement region of the second screen.

In accordance with certain embodiments, the first aperture can have an angular offset circumferentially that is different from an angular offset of the second aperture in relation to a flow axis defined by the screens. The angular offset can be such that the apertures are diametrically opposed to one another and/or axially staggered in relation to one another. It is also contemplated that the first aperture can have a different opening size than the second aperture, the first aperture being larger than the second aperture or vice versa. The screens can have different axial thicknesses, the first screen being thicker than the second or vice versa.

It is also contemplated that in certain embodiments the screen element forms a resistive heating element. The screen element can be constructed from an electrically conductive material, such as a nickel-chromium or iron-chromium-aluminum alloy for example. The screen element can define a source and return voltage terminal for connecting the screen element to a power source resistively heating the screen element and reducing the size of ice particles urged against the screen element by fluid traversing the screen element.

A fuel system for an aircraft includes a source and ground terminal. A resistive heater screen element as described above is connected between the source and ground terminal. A temperature sensor can be connected to the resistive heating element for measuring temperature of at least one of the first and second screening elements. A power source such as a pulse width modulated power source can be electrically connected to the both the temperature sensor and the voltage terminal for driving temperature of the resistive heater screen to a predetermined set point by varying current supplied to the resistive heating element.

In embodiments, the fuel system can include a housing enveloping the resistive heater screen element and defining an ice collection cavity adjacent an upstream face of the first screen. A heat exchanger can be arranged downstream of the resistive heater screen element. The heat exchanger and heating screen element can share a common housing. A filter can be arranged downstream of the heat exchanger and a screen can be arranged downstream of the filter. It is contemplated that a bypass conduit can extend between points upstream of resistive heater screen element and downstream of the heat exchanger. Either or both of the apertures can define a flow area greater than a flow area of the bypass conduit for preventing occlusion of the bypass conduit by fuel and entrained ice.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
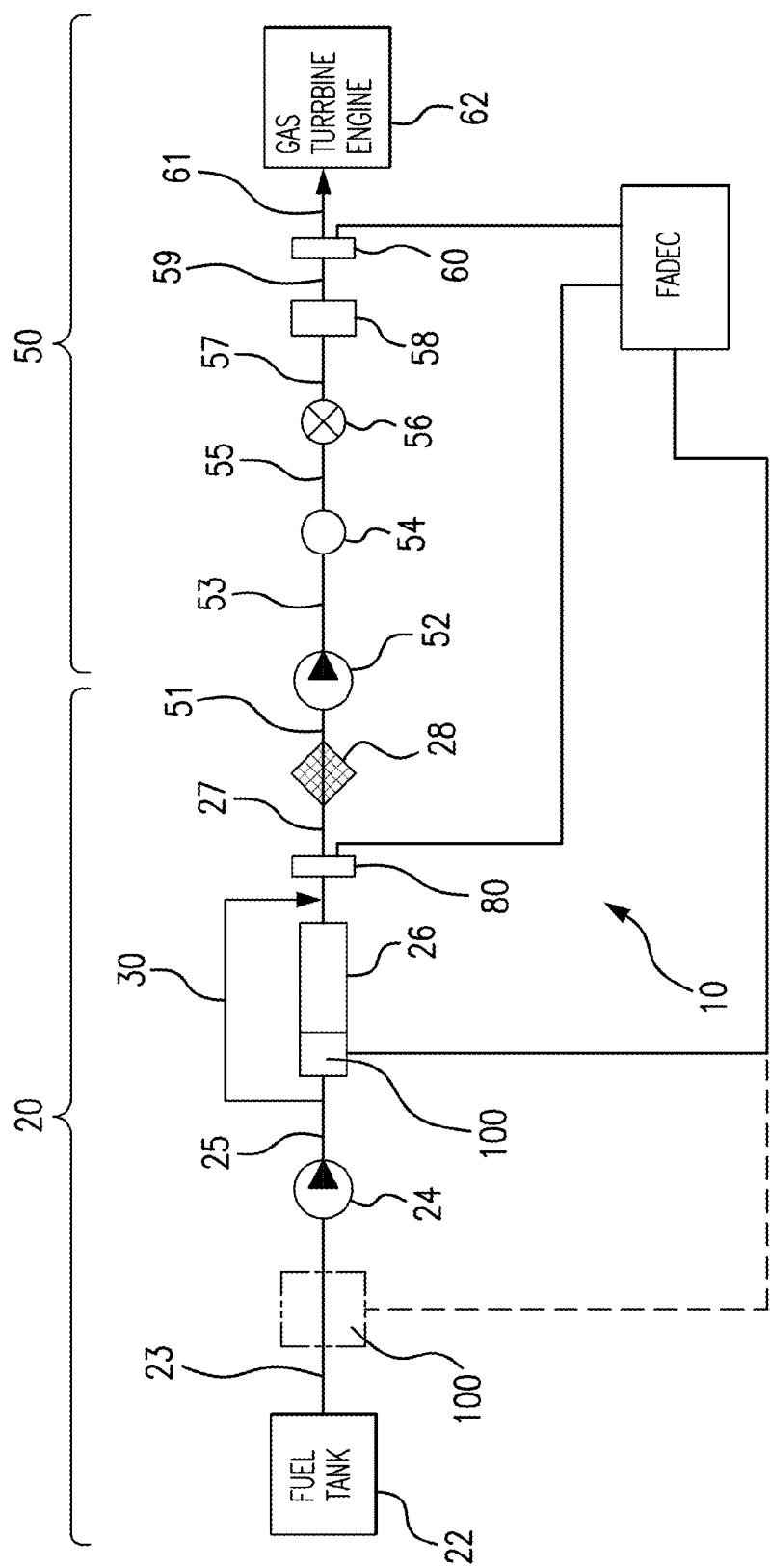
FIG. 1 is a schematic view of an exemplary embodiment of an aircraft fuel system constructed in accordance with the present disclosure, showing a screen element.

Reference will now be made to the drawings wherein like reference numerals identify similar structural features or aspects of the subject disclosure. For purposes of explanation and illustration, and not limitation, a partial view of an exemplary embodiment of a screen filter in accordance with the disclosure is shown in FIG. 1 and is designated generally by reference character 100. Other embodiments of screen filters in accordance with the disclosure, or aspects thereof, are provided in FIGS. 2-5, as will be described. The systems and methods described herein can be used for maintaining fuel flow in gas turbine engines such as aircraft main engines and auxiliary power units (APUs).

With reference to FIG. 1, a fuel system 10 is shown. Fuel system 10 includes a low-pressure segment 20 in fluid communication with a high-pressure segment 50. Low-pressure segment 20 includes a fuel tank 22, a low-pressure pump 24, a fuel-oil heat exchanger 26, and a filter 28. Low-pressure pump 24 is in fluid communication with fuel tank 22 through a conduit 23. Fuel-oil heat exchanger 26 is in fluid communication with low-pressure pump 24 through a conduit 25. Filter 28 is in fluid communication with fuel-oil heat exchanger 26 through a conduit 27. A bypass conduit (leg) 30 extends between conduit 25 and conduit 27 placing filter 28 in fluid communication with low-pressure pump 24 through a path excluding fuel-oil heat exchanger 26.

High-pressure segment 50 includes a high-pressure pump 52, a metering valve 54, and a high-pressure shutoff valve 56. High-pressure segment 50 also includes a screen 58, a fuel flow sensor 60, and a gas turbine engine 62 with at least one fuel nozzle (not shown for clarity purposes). High-pressure pump 52 is in fluid communication with filter 28 through a conduit 51. Metering valve 54 is in fluid communication with high-pressure pump 52 through a conduit 53. High-pressure shutoff valve 56 is in fluid communication with metering valve 54 through a conduit 55. Screen 58 is in fluid communication with high-pressure shutoff valve 56 through a conduit 57. Fuel flow sensor 60 is in fluid communication with screen 58 through a conduit 59. Gas turbine engine 62 is in fluid communication with fuel flow sensor 60 through a conduit 61.

Low-pressure pump 24 and high-pressure pump 52 are engine driven pumps that pressurize fuel traversing fuel system 10 between upstream fuel tank 22 and downstream gas turbine engine 62. This provides a supply of high-pressure flow to metering valve 54. An engine control system such as a full authorization digital engine controller (FADEC) controls metering valve 54 to provide flow sufficient to satisfy the demand of gas turbine engine 62 and maintain engine parameters within predefined limits. It is to be understood that gas turbine engine 62 can be an aircraft main engine or an APU.

A high-pressure bypass valve (not shown for clarity purpose) can be arranged downstream of high-pressure pump 52 and in selective fluid communication with fuel tank 22 to maintain a constant pressure drop across metering valve 54. This maintains a substantially linear relationship between the position of metering valve 54 and the fuel flow achieved. The high-pressure bypass valve can also be operatively associated with an engine over speed governor that limits rotational speed of gas turbine engine 62, e.g., in the event of a FADEC malfunction.

A screen element 100 is disposed between fuel-oil heat exchanger 26 and low-pressure pump 24. Screen element 100 is configured and adapted to prevent ice entrained in fuel traversing fuel system 10 from collecting within fuel system 10, thereby preventing occlusion of fuel system 10 and/or fuel starvation of gas turbine engine 62. In embodiments, screen element 100 is configured and adapted to melt ice contacting its structure while providing minimal flow resistance to fuel flow traversing fuel system 10. This enables positioning screen element 100 upstream of high-pressure pump 52, and in embodiments, immediately upstream of fuel-oil heat exchanger 26. In certain embodiments, screen element 100 is configured and adapted with a buffering feature for managing temporal increases in the amount ice particles entrained in fuel traversing screen element 100. This can improve reliability of fuel systems that experience extremely low temperatures during intervals of low or substantially no fuel flow, such as in a cold-soaked aircraft APU for example.

It is to be understood and appreciated that the above-described conduits, e.g. conduit 23, conduit 25, conduit 27, etc., can form a common fuel line. It is also to be understood and appreciated that other fuel system arrangements are possible within the scope of the present disclosure. For example, as illustrated in FIG. 1 in dashed outline, screen element 100 can optionally be arranged upstream of low-pressure pump 24. Such arrangement could provide the benefit of providing ice protection to low-pressure pump 24 by separating entrained ice from fuel traversing conduit 23 that otherwise could be ingested by low-pressure pump 24.

Figure 2:
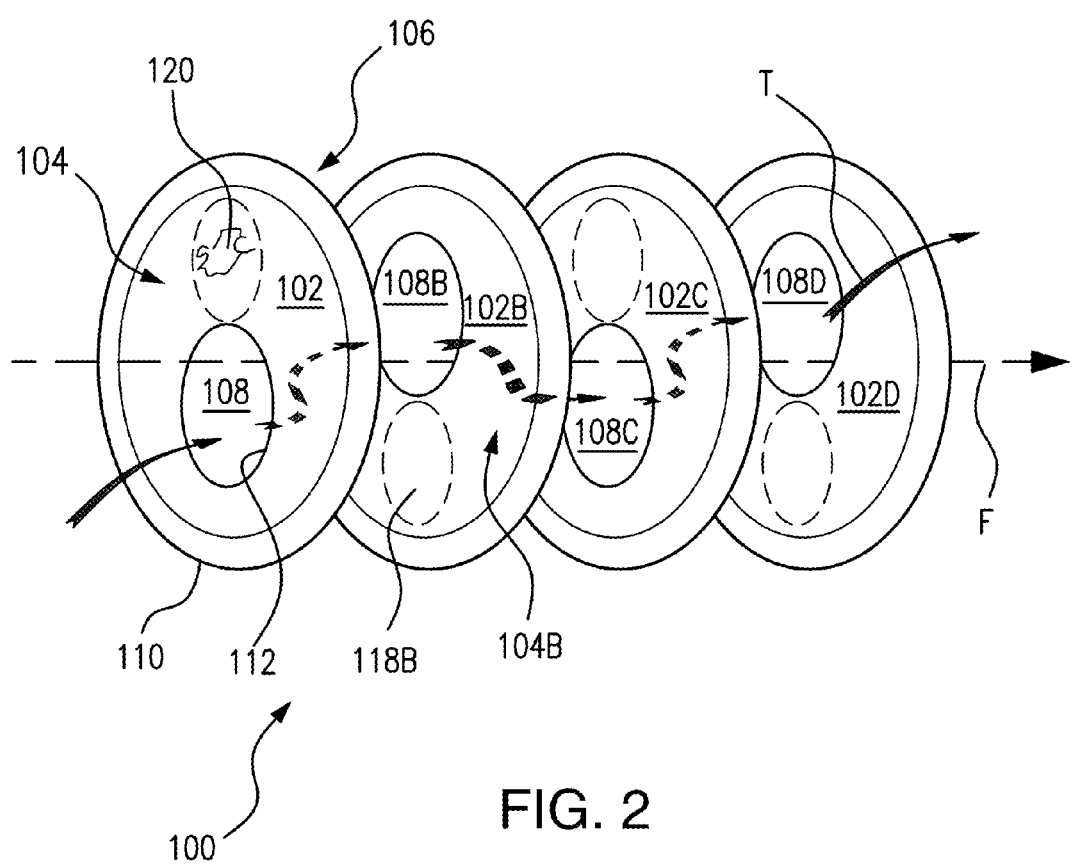
FIG. 2 is an exploded perspective view the screen element of FIG. 1, showing screening bodies and screening body apertures arranged along a fluid flow axis.

With reference to FIG. 2, screen element 100 is shown. As illustrated, screen element 100 is a set of discrete screen structures arranged sequentially in the fuel flow direction within fuel system 10. Screen element 100 includes a screen 102 arranged along a flow axis F. Screen 102 has an upstream face 104 and a downstream face 106. Screen 102 defines an aperture 108 bounded by an aperture periphery 112. Aperture 108 extends through a thickness of screen 102, spanning between upstream face 104 and downstream face 106. Screen 102 extends radially outward from flow axis F to a body periphery 110. As also illustrated in FIG. 2, screen 102 has a disk-like shape with a single aperture 108 defining a low resistance flow area with a circular shape. It is to be understood and appreciated that this configuration is for illustration purposes only, and that other body, aperture shapes, and/or aperture flow area sizes are possible can be used as suitable for an intended application without departing from the scope of this disclosure. It is also to be understood and appreciated that screen element 100 can have a plurality of different apertures as suitable for an intended application. For example, the apertures can defines flow areas that decrease in the direction of fuel flow.

Figure 3:
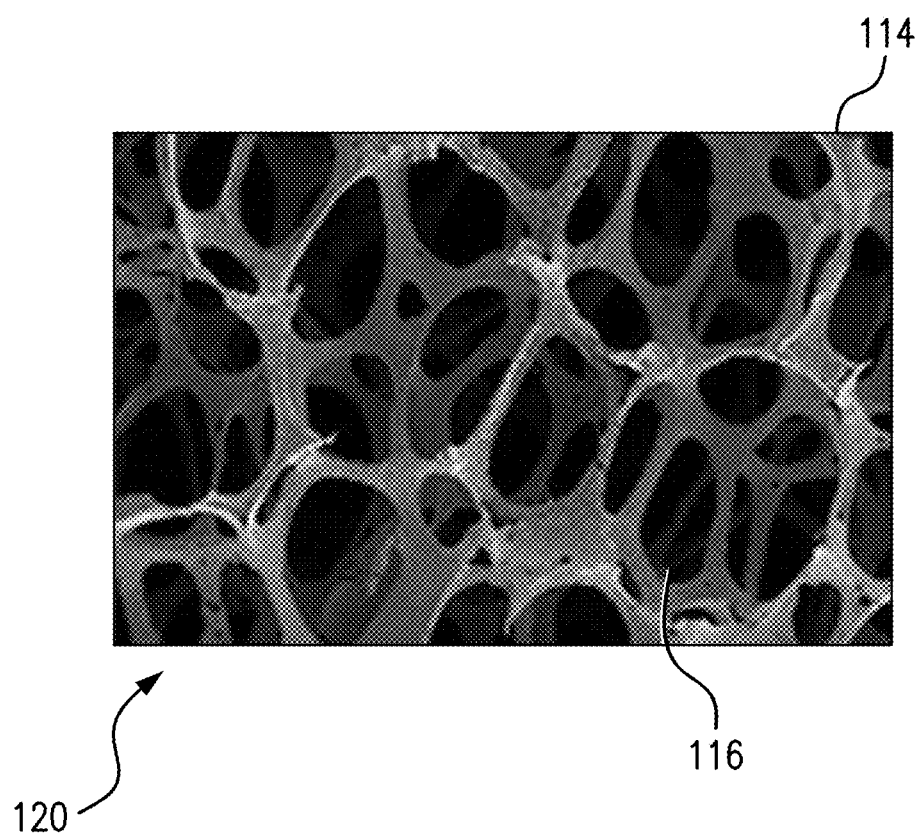
FIG. 3 is a partial view of the screen element of FIG. 1, showing a porous metal foam portion of the screen element adjacent the aperture.

With reference to FIG. 3, a portion of screen element 100 is shown. Screen element 100 includes a porous metal foam labyrinth 114 that defines pores 116. The material forming porous metal foam labyrinth 114 is an electrically conductive material that forms a resilient, rigid structure. In embodiments, porous metal foam labyrinth 114 is formed using a sintering process. It is contemplated that porous metal foam labyrinth 114 includes an iron-chromium-aluminum or nickel-chromium alloy material. Any other suitable material can be used.

Pores 116 are configured and adapted to prevent particles having a size greater than the pore size from traversing screen element 100. It is contemplated that pores 116 define flow areas that are smaller than the flow area defined by aperture 108. In embodiments, pores 116 have flow areas 118 that are about 1 millimeter (about 0.08 inches) wide, or less in some embodiments. The size of respective flow areas of pores 116 influences the rate at which fluid flows through screen 102 (shown in FIG. 2), flow rate being dependent upon the degree of openness of pores 116 and their distribution in screen 102. The minimum size of particles that can be removed is generally smaller than the average pore size due to the labyrinth path that particles must ordinarily follow in order to traverse screen 102. The greater a collective flow areas of pores 116 and aperture 108 (shown in FIG. 2), the greater the flow rate through screen 102 and lower the resistance to fuel flow imposed by screen element 100 (shown in FIG. 2 as a system or set of screen structures). In embodiments, screen 102 has a between about 20 pores/centimeter (about 50 pores/inch) and about 80 pores per centimeter (200 pores/inch). This results in the pores having pore sizes (flow areas) that range from about 0.12 millimeters to about 0.5 millimeters, respectively. It is to be understood and appreciated that bodies with pores with smaller or larger flow areas are contemplated as suitable for an intended application.

With continuing reference to FIG. 2, screen element 100 is illustrated as a multi-screen filter element having a plurality of screens. As illustrated, screen 102 is a first screen and screen element 100 includes a second screen 102B, a third screen 102C, and a fourth screen 102D. Second screen 102B, third screen 102C, and fourth screen 102D are similar in construction to first screen 102 and are arranged such that aperture 108 is out of circumferential alignment with a second aperture 108B, second aperture 108B is out of circumferential alignment with third aperture 108C, and out of circumferential alignment with fourth aperture 108D. First screen 102, second screen 102B, third screen 102C, and fourth screen 102D are angularly offset from one another about flow axis F such that first aperture 108, second aperture 108B, third aperture 108C, and fourth aperture 108D are diametrically opposed to one another in an axially-staggered arrangement. This establishes a torturous path T having relatively low flow resistance through screen element 100. It is to be understood that screen element 100 can have a smaller number or greater number of screens and that different angular offsets are possible between axially adjacent screens as suitable for given applications.

Arranging a given aperture out of circumferential alignment with an axially adjacent, downstream aperture makes fluid flow more rapidly along torturous flow path T than through screen 102 and gives a better (e.g. lower) pressure drop than would be the case without an aperture screen. This arrangement also establishes an impingement area on the axially adjacent, downstream screen. For example, aperture 108 of first screen 102 axially overlays an impingement area 118B defined on upstream face 104B of second screen 102B. Entrained particles in fluid traversing aperture 108 impact impingement area 118B and are urged and/or fixed against impingement area 118B by the force of fluid flowing through porous metal foam labyrinth 114 (shown in FIG. 3) forming second screen 102B. This defines an ice collection cavity 120 (shown in FIG. 4) axially forward of impingement area 118B between upstream face 104B (of second screen 102B) and downstream face 106 (of first screen 102).

Figure 4:
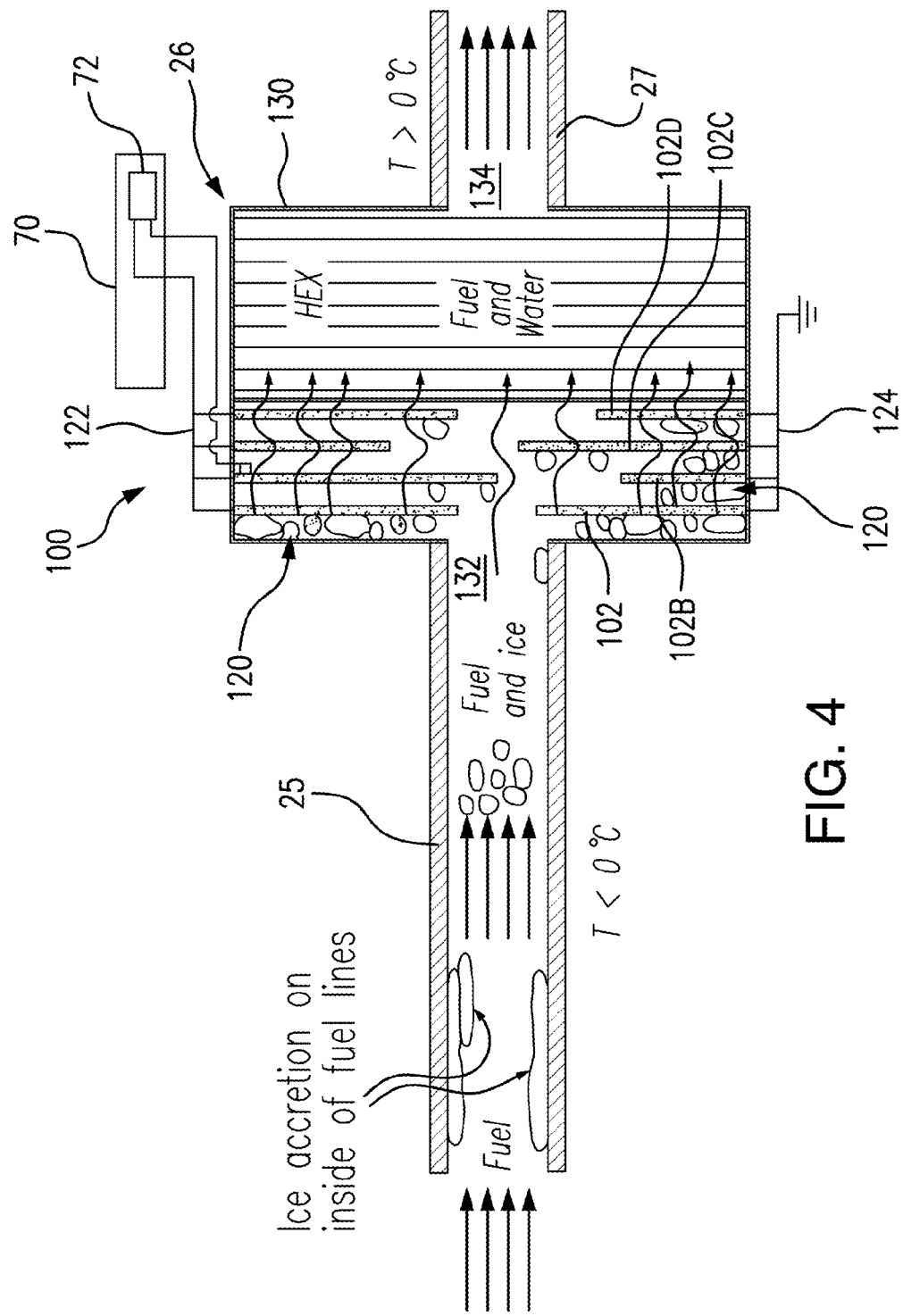
FIG. 4 is schematic cross-sectional side elevation view of the screen element of FIG. 1, showing the screen element arranged upstream of a heat exchanger.

With reference to FIG. 4, fuel-oil heat exchanger 26 and screen element 100 are shown. Screen element 100 includes a voltage source terminal 122 and a ground terminal 124. Voltage source terminal 122 is connected to a direct current (DC) power supply 70 for resistively heating screen element 100, at least one of first screen 102, second screen 102B, third screen 102C, and fourth screen 102D thereby forming a resistive heater screen element. Alternating current can also be used without departing from the scope of this disclosure.

Fuel-oil heat exchanger 26 includes a housing 130 with an inlet 132 and an outlet 134. Inlet 132 is connected to conduit 25 and outlet 134 is connected to conduit 27. Housing 130 envelopes both screen element 100 and fuel-oil heat exchanger 26 such that fuel-oil heat exchanger 26 is disposed immediately downstream of screen element 100. This can prevent re-freezing of melted ice water prior to entering fuel-oil heat exchanger 26. This can also reduce the potential for solid ice blockage and/or damage to internal heat exchanger structures that otherwise could reduce the efficiency of fuel-oil heat exchanger 26 by allowing a mixture of fuel and water to safely enter and flow though fuel-oil heat exchanger 26 in liquid form. In embodiments having screen elements formed from thermally conductive materials, arranging screen element 100 immediately upstream of fuel-oil heat exchanger 26 provides additional heating of screen element 100 through heat conduction from fuel-oil heat exchanger 26 into screen element 100.

In embodiments, screen element 100 requires relatively small amounts of electric power applied to screen element 100 to provide sufficient heating to effectively melt ice. For example, in embodiments, during flight at 19,000 feet in ambient air with a temperature of −23 degrees Celsius, about 16 kW of power is required to raise the temperature of screen element 100 to +8 degrees Celsius for a given fuel flow rate through screen element 100. This is about a 60% reduction from the about 60 kW necessary to increase the temperature of fuel flowing through the filter from −23 degrees Celsius to +8 degrees Celsius.

Ice collection cavity 120 can be a first ice collection cavity, and a second ice collection can be defined between first screen 102 and second screen 102B. This can increase the residence time of ice particles separated from fuel flowing through screen element 100 near and/or at the heated sintered porous metal foam metal screen structure (s). It also allows for temporary accumulation of ice particles while the heating capacity of screen element 100 is increased. This can improve the responsiveness of fuel system 10 (shown in FIG. 1) to transient vibrations of partially frozen system components where relatively large ice particles accreted internally can break loose, become entrained, and be swept through fuel system 10 and into screen element 100. In embodiments, ice collection cavity 120 has a volume of about 250 milliliters (about 15 cubic inches).

Figure 5:
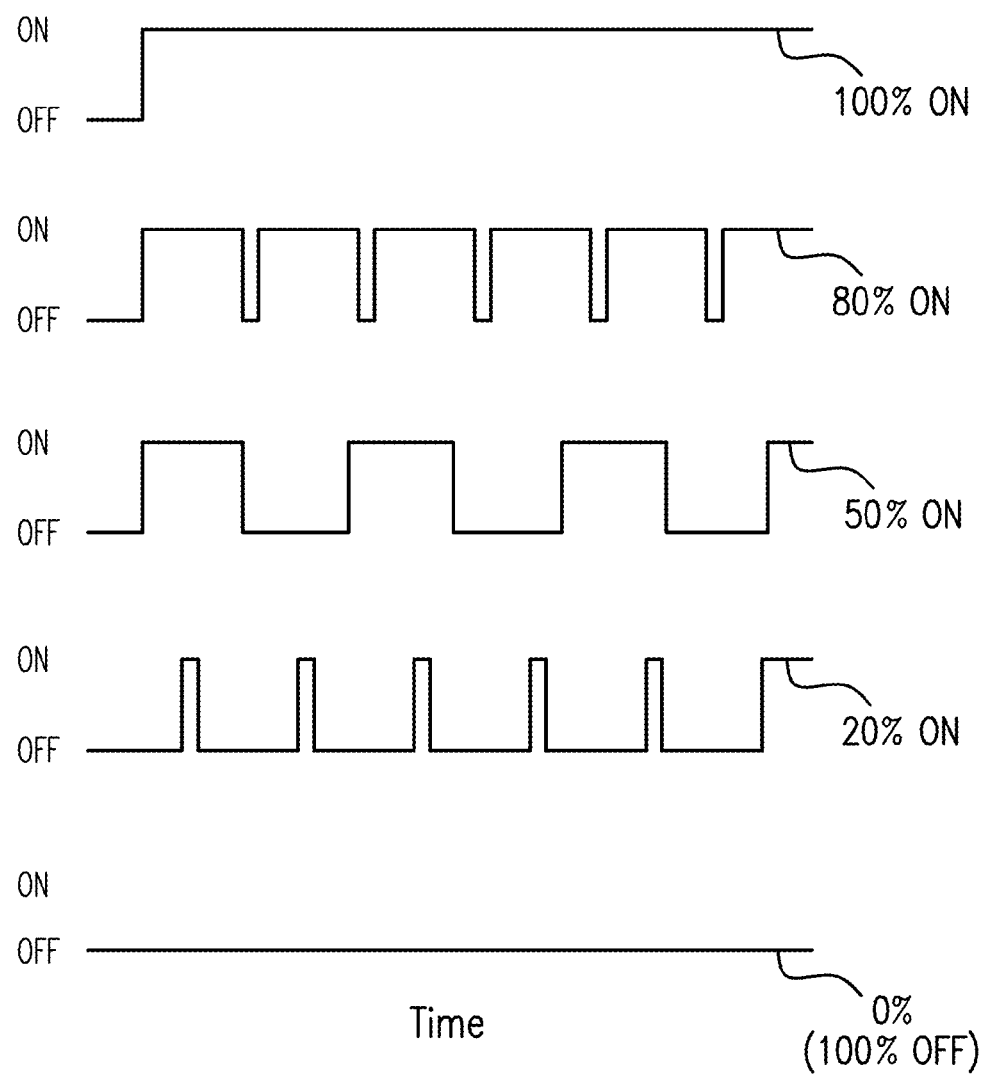
FIG. 5 is a graphical representation of pulse width modulator output applied to the screen element of FIG. 1, showing

With reference to FIG. 5, duty cycles are shown. Power supply 70 (shown in FIG. 4) is a DC power supply and includes a pulse width modulation device (PWM) 72 (shown in FIG. 4) configured and adapted for applying voltage to screen element 100 (shown in FIG. 4) in range of duty cycles. In a 100% duty cycle, PWM 72 applies a continuous current flow to screen element 100 during a given time interval. In an 80% duty cycle, PWM 72 applies current during alternating ON and OFF intervals wherein aggregate ON duration is 80% during a given time interval. In a 50% duty cycle, PWM 72 applies current during alternating ON and OFF intervals wherein aggregate ON duration is 50% during a given time interval. In a 20% duty cycle, PWM 72 applies current during alternating ON and OFF intervals wherein aggregate ON duration is 20% during a given time interval. In a 0% duty cycle PWM 72 applies no current to screen element 100 during a given time interval, i.e. when PWM 72 is off). Duty cycle percentages can vary as suitable for a given application.

It is contemplated that a fuel temperature sensor 80 can be directly connected to screen element 100 (shown in FIG. 4) and operatively associated with PWM 72. Based on temperature readings provided by fuel temperature sensor 80, PWM 72 can alter the duty cycle of current applied to screen element 100. This can be used to continuously drive screen element 100 to a predetermined temperature, thereby matching power consumption to ice melting or depletion. This allows for more closely matching electrical power consumed by the screen elements to that necessary to melt ice accumulated at the screen element.

In embodiments, the screen elements described herein can provide a robust, simple, and lightweight device for prevention of ice particle accretion and/or occlusion of fuel system components. The screen elements can also potentially require less electrical heating power than heating fuel traversing the fuel system directly by targeted heating of ice particles rather than heating the entire volume of fuel conveying the ice particles. In certain embodiments, heating efficiency is further improved through variable heating control based on fuel temperature and mass flow readings from fuel temperature sensor 80 and fuel flow sensor 60, respectively. Fuel temperature sensor 80 and flow sensor 60 can further be connected to the on-board FADEC as well. This allows for increasing and decreasing the heat generated by the screen element based on the amount of ice entrained in fuel traversing the fuel system. In embodiments, screen elements described herein allow for quick main engine and/or APU re-light or re-start following an unwanted engine in-flight shutdown event.

The methods and systems of the present disclosure, as described above and shown in the drawings, provide for screen devices with superior properties including improved ice melting capability. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A screen element for a fuel system, comprising:
   a first screen defining a first aperture; and
   a second screen axially offset from the first screen and defining a second aperture,
   wherein the first screen and the second screen are rigid, the entirety of the second screen being axially spaced apart from the first screen,
   wherein the first and second apertures are out of circumferential alignment to define a torturous flow path traversing the first and second screens for capturing particles smaller than the first and second apertures in a collection cavity defined between the first and second screens.

2. A screen element as recited in claim 1, wherein the first screen includes a sintered porous metal foam material adjacent the first aperture having a plurality of pores with pore sizes smaller than the first aperture.

3. A screen element as recited in claim 1, wherein the first aperture has an angular offset about an axis of the screen element that is different from an angular offset of the second aperture.

4. A screen element as recited in claim 1, wherein the first aperture has a larger diameter than the second aperture.

5. A screen element as recited in claim 1, further including a voltage source terminal connected to first and second screening bodies for resistively heating the screen element.

6. A screen element as recited in claim 1, wherein a thickness of the second screening body is greater than a thickness of the first screening body.

7. A fuel system for an aircraft, comprising:
   voltage source and ground terminals; and
   a resistive heater screen element connected between the voltage source and ground terminals, wherein the screen element includes:
   a first screen defining a first aperture; and
   a second screen axially offset from the first screen and defining a second aperture,
   wherein the first screen and second screen include a porous metal foam material having a plurality of pores, wherein the pores have respective pore sizes smaller than the first and second apertures, and
   wherein the first and second aperture are out of circumferential alignment to define a torturous flow path traversing the screens for capturing particles smaller than the apertures in a collection cavity defined between the first and second screens.

8. A fuel system as recited in claim 7, further including a housing enveloping the resistive heater screen element and defining an ice-collecting cavity adjacent an upstream face of the first screen.

9. A fuel system as recited in claim 7, further including a heat exchanger arranged immediately downstream of the resistive heater screen element.

10. A fuel system as recited in claim 9, further including a bypass conduit connected upstream of the resistive heater screen element and downstream of the heat exchanger.

11. A fuel system as recited in claim 10, wherein a diameter of at least the first aperture has a flow area that is equal to or greater than a flow area of the bypass conduit.

12. A fuel system as recited in claim 7, further including a temperature sensor connected to the resistive heating element and configured for measuring temperature of at least one of the first and second screening elements.

13. A fuel system as recited in claim 12, further including a pulse width modulator electrically connected to the both the temperature sensor and the voltage terminal and configured varying current supplied to the resistive heating element.

14. A fuel system as recited in claim 7, further including a filter downstream of and in fluid communication with the resistive heating element.

15. A fuel system as recited in claim 14, further including a screen downstream of and in fluid communication with the filter.

\* \* \* \* \*